Aug. 31, 1948.　　　F. J. WODITSCH　　　2,448,164
PIN TOOTH GEARING
Filed Sept. 25, 1944
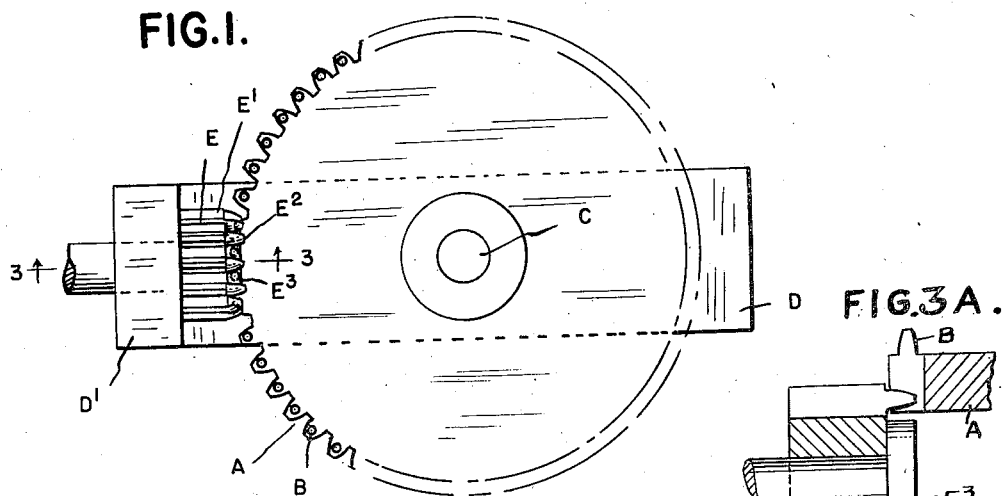
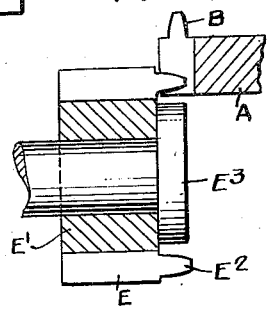
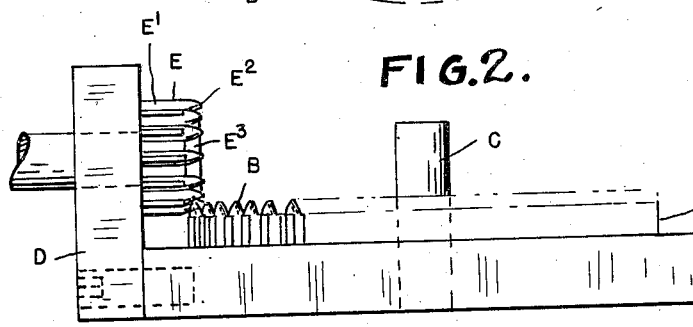
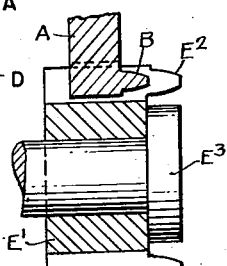
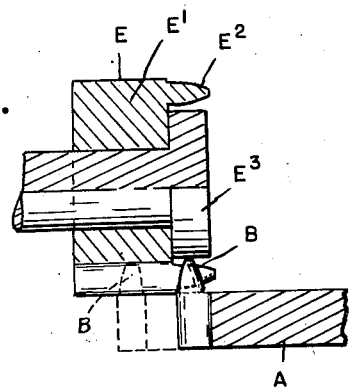
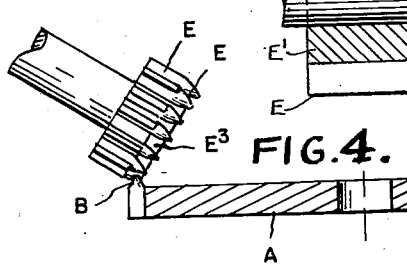
INVENTOR.
FRANK J. WODITSCH
BY
Whittemore Hulbert & Belknap
ATTORNEYS Patented Aug. 31, 1948

2,448,164

UNITED STATES PATENT OFFICE 2,448,164

PIN TOOTH GEARING

Frank J. Woditsch, St. Clair Shores, Mich., assignor of one-half to Raymond C. Patzer, Detroit, Mich.

Application September 25, 1944, Serial No. 555,680

1 Claim. (Cl. 74—416)

The invention relates to gearing more particularly designed for use in toy building sets but also applicable to other uses where the loads are light.

It is the object of the invention to obtain a construction which may be used either as a spur gear or for connecting shafts which extend at various angles to each other. To this end the invention consists in the construction as hereinafter set forth.

In the drawings:

Fig. 1 is a plan view showing a gear and intermeshing pinion of my improved construction.

Fig. 2 is a side elevation of the construction shown in Fig. 1;

Fig. 3 is a section on line 3—3, Fig. 1; and

Figs. 3A and 3B are similar views showing different engagements of the gears.

Fig. 4 shows an arrangement of intermeshing gears in which the axis of the pinion F is at an oblique angle to the axis of the gear wheel A.

As illustrated, my improved gearing comprises a spur gear A having projecting from one end of each tooth thereof a pin B. This pin is circular in cross section and is of a longitudinal section which will properly mesh with a companion spur gear, the axis of which is at an angle to the axis of the pin gear. For instance, the pins may be of an involute form in longitudinal section. As illustrated in Figs. 1 and 2, a comparatively large gear A is mounted on a shaft C journaled in a bearing in a frame D. A smaller gear or pinion E is mounted on a shaft F which is journaled in a bearing in a portion D' of the frame extending at right angles to the portion D. The pinion E includes a spur portion E' and projecting pins $E^2$ similar to the pins B of the gear A. Also, as shown in Figs. 2 and 3, the pins $E^2$ of the pinion are in mesh with the pins B of the gear A. However, if the pinion E were to be placed in the position shown in dotted lines (Fig. 3), the pins B would intermesh with the spur portion E' of said pinion. Also, the spur teeth of the gear A are capable of intermeshing with the pins $E^2$ of the pinion E as shown in Fig. 3A or the spur teeth of both pinion and gear may be intermeshed as shown in Fig. 3B.

As shown in Fig. 3, the pins B of the gear A are limited in their engagement with the pins $E^2$ of the pinion E by a cylindrical portion $E^3$ of said pinion. Thus, the ends of the pins B will be in rolling contact with the periphery of the cylinder $E^3$ and the axis of the latter will be at an angle of 90° to the axis of the gear A. It is not, however, necessary that the axes of the gear and pinion should be at 90° to each other for, as shown in Fig. 4, the axis of the pinion E can stand at an oblique angle to the axis of the gear wheel A, while at the same time the pins $E^2$ will be in intermeshing engagement with the pins B.

It will be apparent from the description above given that this gearing can be used in the building of a great variety of toy mechanisms. Also, that for operating any mechanism under light load, such a type of gearing may be successfully used.

What I claim as my invention is:

A gearing comprising a pair of gears, each having spur teeth around the periphery thereof and a pin tooth extension of each spur tooth projecting from one end thereof, one of said gears having a cylindrical portion radially within the pin tooth extensions thereof for rolling engagement with the pin teeth of the other gear and for holding the latter against binding engagement.

FRANK J. WODITSCH.

REFERENCES CITED

The following references are of record in the file of this patent:

UNITED STATES PATENTS

| Number | Name | Date |
|---|---|---|
| 1,025 | Lewis | Nov. 29, 1838 |
| 630,709 | Jamieson | Aug. 8, 1899 |
| 670,298 | Roberts | Mar. 19, 1901 |
| 1,951,139 | Fahrney | Mar. 13, 1934 |

FOREIGN PATENTS

| Number | Country | Date |
|---|---|---|
| 547 | Great Britain | 1897 |
| 444,154 | Germany | May 12, 1927 |